No. 886,135. PATENTED APR. 28, 1908.
O. A. KNOPP.
WATTMETER TESTING APPARATUS.
APPLICATION FILED JUNE 19, 1907.
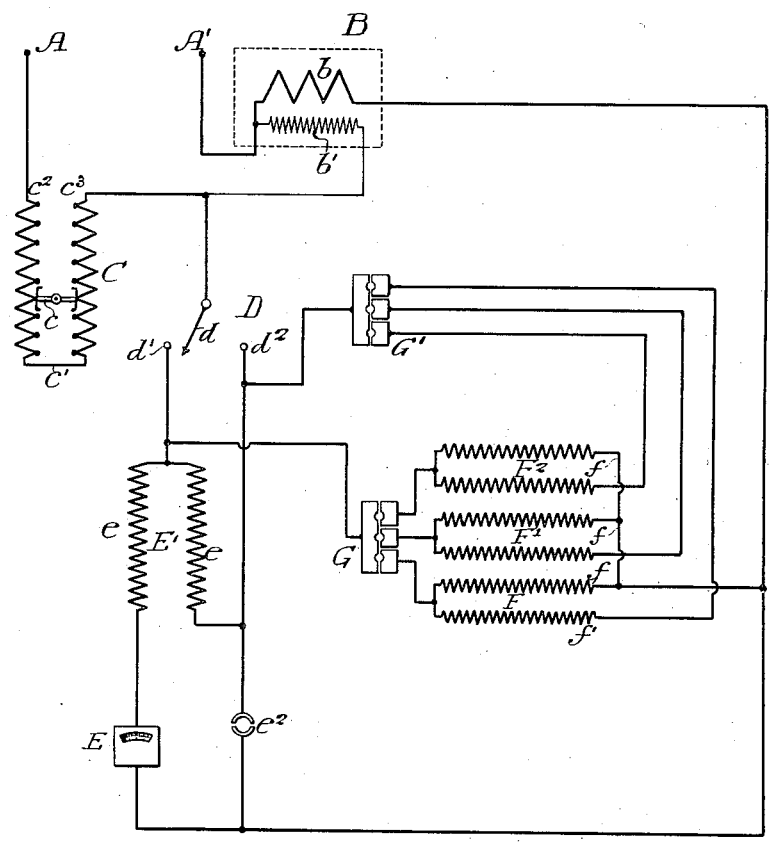
Witnesses:—
Inventor
Otto A. Knopp.
by his Attorneys,
Howson & Howson

UNITED STATES PATENT OFFICE.

OTTO A. KNOPP, OF OAKLAND, CALIFORNIA.

WATTMETER-TESTING APPARATUS.

No. 886,135.

Specification of Letters Patent.

Patented April 28, 1908.

Application filed June 19, 1907. Serial No. 379,783.

*To all whom it may concern:*

Be it known that I, OTTO A. KNOPP, a subject of the Emperor of Germany, residing in Oakland, California, have invented certain Improvements in Wattmeter-Testing Apparatus, of which the following is a specification.

One object of my invention is to provide a compact assemblage of apparatus particularly designed and connected to provide a convenient means for testing recording wattmeters without the necessity for removing them from the various positions in which they may be installed; it being further desired that the apparatus shall be of such a nature as to be conveniently portable. In addition, it is desired to provide a wattmeter testing set, which, though consisting of but relatively few pieces of apparatus, shall be capable of testing wattmeters of widely ranging capacities and under widely varying loads, in order to properly calibrate them to ascertain their condition or accuracy. These objects and other advantageous ends I secure as hereinafter set forth, reference being had to the accompanying drawing, in which;—the figure is a diagrammatic representation of the apparatus comprising my improved testing set.

In the above drawing, A and A' represent the terminals of the device, which it will be understood are connected to any desired source of current, while B represents a wattmeter to be tested. This latter is provided with a current coil $b$ through which, under service conditions, passes the current to be measured and in addition there is a potential coil $b'$ connected across the current supply mains, but in series with a variable regulating resistance C. This resistance while being capable of variation in any of the ways well known to the art, in the present instance is illustrated as having its coil so arranged that the amount of resistance in circuit may be varied by shifting the position of a sliding arm $c$; it being noted that the wire constituting this resistance is preferably made of increasing current carrying capacity from the point $c'$ at the ends of the two bodies of resistance shown, toward the two points $c^2$ and $c^3$, which latter are so connected as to permit the sliding arm $c$ to short circuit the entire body of resistance C when they are simultaneously engaged by said arm $c$. The first of the points $c^2$ or one end of the resistance coil C, is connected to the current supply main A, while the terminal $c^3$ is connected to the movable arm $d$ of a two-point switch D. One of the terminals $d'$ of this switch is connected through a standard resistance unit $e$ and an ammeter E to one end of the current coil $b$ of the wattmeter B; the other end of this coil being connected to the current supply main A'. A second standard resistance unit $e'$ has one end connected to the terminal $d'$ of the switch D and its second end connected through a switch $e^2$ to that portion of the connection which extends between the ammeter E and the current coil of the wattmeter. The second terminal $d^2$ of the switch D is connected to a conductor extending between the standard resistance unit $e'$ and the switch $e^2$.

In addition to the above, I provide any desired number of resistance units (in the present instance three, indicated at F, F' and F$^2$) each consisting of two sections $f$ and $f'$, and I connect these coils with switches G and G' in such manner that any of the coils $f$ may be thrown in parallel with the standard resistance coil $e$ and the ammeter E by proper manipulation of the switch G. Similarly, by suitably manipulating the switch G' any one of the entire resistance units F, F' or F$^2$ may be thrown in parallel with the two resistance units $e$ and $e'$ connected in series with each other and with the ammeter E.

Under operating conditions, it is obvious that if the sliding arm of the variable resistance C be placed to completely cut out said resistance, and the switch arm $d$ be placed in contact with either of the points $d'$ or $d^2$, while the switches G, G' and $e^2$ are open, a certain definite and fixed voltage will cause a certain current to flow and be indicated on the ammeter E.

Assuming that the arm $d$ be in engagement with the point $d'$ of the switch D and that the resistance of the coil $e$ is known, the indication of the ammeter, in addition to directly giving the amount of current flowing in the circuit, and therefore, through the current coil $b$ of the wattmeter, will also, by the well known calculation, give the voltage causing such flow of current. From these two quantities it is now possible to determine the watts of the circuit and, therefore, to at once calibrate the wattmeter B for this load, as determined by the single coil $e$ of the standard resistance. The variable resistance C being connected outside of the testing circuit included between the current supply main A' and the point of connection between the switch D and the potential coil $d'$ may, if desired, be varied in order to bring the voltage applied to the wattmeter and the other apparatus concerned in the testing circuit, to any desired figure.

In order to vary the load upon the wattmeter any one of the coils $f$, of the units F, F' and F², may be thrown into parallel with the coil $e$ and the ammeter E by placing the plug of switch G in the proper recesses; it being understood that these various coils are of different but predetermined and standard resistance.

It will be seen that the plugging into the circuit of the coils $f$ does not increase the current flowing through the coil $e$ and the ammeter E, but merely serves to increase the value of the scale reading on the ammeter by causing additional current to flow through the wattmeter. With the switch G open, the load on the wattmeter may be further increased by closing the switch $e^2$, inasmuch as this places the coil $e'$ in parallel with the coil $e$ and the ammeter E, and if with this arrangement the various ones of the coils $f$ be thrown into circuit, a correspondingly increased number of different loads is placed upon the wattmeter B.

Should it be desired to test a wattmeter adapted to operate at a higher voltage than that for which the coils $f$ and $e$ are designed, then the arm $d$ of the switch D may be placed in engagement with the terminal $d^2$; it being understood that the switches $e^2$ and G are open under these conditions. This arrangement of connections places the coil $e'$ in series with the coil $e$ and with the ammeter E, and if the switch G be properly manipulated, it will be seen that any one of the resistance units F, F' or F² may be thrown in parallel with the entire resistance unit E' and the ammeter, as before giving a wide range of load variation to the wattmeter.

It will be understood that the standard resistance units have a temperature coefficient of zero and under commercial conditions are so proportioned that the apparatus is used with the arm $d$ of the switch D in engagement with the contact point $d'$ on a 110 volt circuit and with the arm on the contact $d^2$ on a 220 volt circuit.

I claim:—

1. A wattmeter testing set including a two-point switch connected to one current supply main, a standard resistance unit having two sections, an ammeter having one terminal connected to one of said sections and a second terminal connected to the wattmeter to be tested, and a second switch connected between one of the points of the first switch and the connection between the wattmeter and the ammeter, both sections of the resistance unit being connected to the second point of the two-point switch, and the second section of said resistance unit being connected between the first point of said switch and the second switch, substantially as described.

2. A wattmeter testing set including a standard resistance unit having two sections, an ammeter, a two-point switch, and a single point switch, with connections between said apparatus arranged to permit of said two resistance sections being connected both in series with the ammeter, one in series with the ammeter and the other in parallel with the ammeter and the first section, or one of said sections in series with the ammeter, substantially as described.

3. A wattmeter testing set including a two-point switch, a standard resistance unit having one section connected between the two contact points of said switch and a second section having one end connected to one of the contacts of said switch, an ammeter in series with said second section, with a connection between said ammeter and the wattmeter to be tested, and a switch for connecting the two sections of the resistance in parallel with each other, substantially as described.

4. A wattmeter testing set including a two-point switch, a standard resistance unit having two sections, a plurality of standard shunt resistances also each having two sections, an ammeter in series with one of the sections of the standard resistance unit, means for placing one section of any one of the shunt resistances in parallel with one of the sections of the standard resistance and the ammeter, and means for placing both sections of any one of the shunt resistances in parallel with both sections of the standard resistance unit connected in series with each other and with the ammeter, substantially as described.

5. The combination of a two-point switch, two multiple point switches, a plurality of bodies of shunt resistance connected to said multiple point switches, a body of standard resistance having two sections, one of the sections being connected between the contacts of the two-point switch, an ammeter in series with the other section, and connections whereby any one of the shunt resistances may be connected as a whole in parallel to the two sections of the standard resistance connected in series with each other and with the ammeter, said connections also permitting one section of any of the shunt resistances being connected in parallel with one of the sections of the standard resistance, substantially as described.

In testimony whereof, I have signed my name to this specification, in the presence of two subscribing witnesses.

OTTO A. KNOPP.

Witnesses:
H. A. LUTTRELL,
J. C. PINKERTON.